US006592972B1

(12) United States Patent
Trantoul

(10) Patent No.: US 6,592,972 B1
(45) Date of Patent: Jul. 15, 2003

(54) METHOD AND PRODUCT FOR PROTECTING AN OBJECT WITH A SOLUBLE BINDER SECURITY PRINT

(76) Inventor: François Trantoul, Mas le Cantadou, 1312 chemin du Pont des, Anes - 34400 Lunel (FR)

( * ) Notice: Subject to any disclaimer, the term of this patent is extended or adjusted under 35 U.S.C. 154(b) by 0 days.

(21) Appl. No.: 09/743,911

(22) PCT Filed: May 17, 2000

(86) PCT No.: PCT/FR00/01312

§ 371 (c)(1),
(2), (4) Date: Jan. 17, 2001

(87) PCT Pub. No.: WO00/71361

PCT Pub. Date: Nov. 30, 2000

(30) Foreign Application Priority Data

May 21, 1999 (FR) .......................................... 99 06500

(51) Int. Cl.7 .................................................. B32B 3/00

(52) U.S. Cl. ....................... 428/195; 428/198; 428/199; 428/201; 428/207; 428/213; 428/216; 428/339; 428/346; 428/423.1; 428/480

(58) Field of Search ................................ 428/195, 213, 428/216, 339, 346, 423.1, 480, 198, 199, 201, 207

(56) References Cited

U.S. PATENT DOCUMENTS

| | | | | |
|---|---|---|---|---|
| 5,232,527 A | | 8/1993 | Vernhet et al. | |
| 5,387,013 A | * | 2/1995 | Yamauchi et al. | 283/86 |
| 5,828,393 A | * | 10/1998 | Hotomi | 347/71 |
| 5,891,520 A | | 4/1999 | Caruso et al. | |

FOREIGN PATENT DOCUMENTS

| | | |
|---|---|---|
| EP | 0 271 941 | 6/1988 |
| EP | 0 407 615 | 1/1991 |
| FR | 2 675 742 | 10/1992 |
| FR | 2 763 889 | 12/1998 |

* cited by examiner

*Primary Examiner*—Deborah Jones
*Assistant Examiner*—Ling Xu
(74) *Attorney, Agent, or Firm*—Young & Thompson

(57) ABSTRACT

A security imprint (4) is interposed between a protective film (2) of synthetic material and a surface (8) of an object (9) to be protected, onto which surface the film is glued by means of an adhesive (3). The security imprint (4) includes an ink composition having at least one pigment, a bonding agent, and a soluble agent. The soluble agent dissolves in a solvent that is intended to release the adhesive (3) and produces a visible stain.

11 Claims, 7 Drawing Sheets

METHOD AND PRODUCT FOR PROTECTING AN OBJECT WITH A SOLUBLE BINDER SECURITY PRINT

BACKGROUND OF THE INVENTION

The invention relates to the protection of an object against falsifications and/or for purposes of authentication and/or in order to guarantee its intactness, by means of a thin protective film, in particular a transparent film, of synthetic material which is designed to be glued onto the surface of an object.

The object can for example be an official document (passport, identity card, driving license etc), which contains variable details (surname, first name, address etc of the holder), to be protected against attempted falsification. In this case, the film is transparent. The object can also be an official document, packaging, or any product or article on which the presence of the film guarantees the authenticity of the object and/or its intactness (i.e. the fact that it has not previously been used, or consumed, or tampered with). The film is then not necessarily transparent, but incorporates security patterns which are impossible or difficult to reproduce (hologram, anti-photocopy printing, pigments which are invisible in visible light, but visible in invisible light, etc).

Attempted falsification, forgery or violation of objects which are protected by a film consists mostly of ungluing the film by means of a solvent used to dissolve the adhesive which keeps the film glued onto the object, without damaging the object, or the text it bears, or, preferably, the protective film.

Throughout the text, the term "adhesive" designates generally any composition which has the property of adhering in certain conditions, and therefore includes not only self-adhesives (or pressure-sensitive adhesives), but also adhesives which can be reactivated or sealed by heat (or hot glued), and glues in general (mono- or multi-component).

The solvents used by defrauders can be aqueous polar solvents (water, detergent- or alcoholic- aqueous solution etc), or non-aqueous polar solvents (acetone, alcohol, etc), or non-polar solvents (hydrocarbons such as petrol, ether, white spirit etc).

A protective film is already known (FR 2,675,742), comprising patterns printed with an ink composition which incorporates at least one pigment which is soluble in hydrocarbons.

However, pigments of this type are rare, and do not make it possible to obtain all the security patterns required. In particular, they have low variety of colors and effects. Consequently, their presence can be detected by observation by informed defrauders.

Compositions of reagents are also known, which can be incorporated into papers, and are normally colorless, but react in contact with a solvent such as to become colored.

In general, reagents to polar solvents are colored black, and reagents to non-polar solvents are colored blue. These reagents therefore make it possible to reveal an attempt to attack the paper by a solvent. However, they have several disadvantages. Firstly, their reactivity decreases over a period of time until it disappears, such that they cannot provide long-term protection. Secondly, the reaction of coloring in contact with the solvents implements chemical processes which are poorly controlled, and the reactivity of the reagents is not constant on the basis of production, such that it is never certain that the quantity of reagents incorporated in the paper when it is produced actually makes it possible to trigger the reaction. In other words, these colored reagents cannot be used with great reliability. Thirdly, these reagents react in general with the adhesive compositions, which themselves contain solvents, plasticisers and wetting agents, such that they are not compatible with protection by gluing a film onto the paper, since a reaction is triggered during application and setting of the adhesive, and even after the adhesive has set.

Compositions of inks are also known which incorporate reagent pigments which change color in contact with a solvent. However, in this case also, these reagent pigments react with the adhesive compositions. In addition, these pigments are also limited in number and shades, such that they have a low variety of colors and effects, and can be detected by an informed observer.

SUMMARY OF THE INVENTION

The object of the invention is thus to eliminate these disadvantages, by proposing a method and a product for protection of an object by means of a film glued onto a surface of the object, wherein attempts to unglue the film by attack by solvents can be revealed reliably and irreversibly over a long period of time (without a substantial decrease in the efficiency of the detection in the long term), and in a manner which is compatible with the gluing of the film onto the object.

The object of the invention is also to prevent this protective function from being detected in advance (by revealing attempts to unglue the film) in the protected object, in particular by simple visual observation by informed defrauders.

The object of the invention is also to permit production of security imprints by means of an ink composition which incorporates this function of protection by revealing attempted attacks by polar and/or non-polar solvents, and which makes it possible to obtain all the patterns, colors and effects required, as in the case of a conventional ink.

The object of the invention is also to propose a method for production of a product for protection according to the invention, and an object protected by a method for protection according to the invention.

The invention also makes it possible to achieve these aims simply and economically, in particular by silk-screen printing.

For this purpose, the invention relates to a method for protection of an object in which a thin protective film of synthetic material is glued onto a surface of the object, by means of a layer of adhesive interposed between the said surface and the object, in order to protect the object against falsifications and/or in order to authenticate it, and/or in order to guarantee its intactness, wherein, between the film and the said surface of the object, there is interposed at least one imprint, known as security imprint, produced by means of an ink composition comprising at least one pigment and a bonding agent which can be hardened by drying in air, designed to form a layer of imprint which is solid after it has dried, and incorporating at least one agent, known as a soluble agent, which is designed to be dissolved, at least in standard conditions of temperature and pressure, after the bonding agent has dried, in any polar and/or non-polar liquid solvent which can permit ungluing of the adhesive when it is placed in contact with this adhesive after gluing, the quantity of soluble agent(s) in the bonding agent being designed such the security imprint can form at least one stain which is visible, which reveals any attempt at ungluing by means of at least one such solvent.

The invention also extends to a method for production of a product for protection of an object comprising a thin protective film of synthetic material, which is designed to be glued onto a surface of the object by means of a layer of adhesive interposed between the said surface and the object, in order to protect the object against falsifications and/or in order to authenticate it, and/or in order to guarantee its intactness, characterized in that on an imprint support there is provided at least one imprint, known as a security imprint, with an ink composition comprising at least one pigment and a bonding agent which can be hardened by drying in air, designed to form a layer of imprint which is hard after it has dried, this bonding agent incorporating at least one agent, known as a soluble agent, which is designed to be dissolved, at least in standard conditions of temperature and pressure, after the bonding agent has dried, in many polar and/or non-polar liquid solvent which can permit ungluing of the adhesive when it is placed in contact with this adhesive after gluing, the quantity of soluble agent(s) in the bonding agent being designed such that the security imprint can form at least one stain which is visible, and reveals any attempt at ungluing by means of at least one solvent, the imprint support being designed to permit interposition of the security imprint between the film and the said surface of the object.

The invention also extends to the product obtained by the method for production according to the invention. It thus also relates to a product for protection of an object comprising a thin protective film of synthetic material, comprising a layer of adhesive such that it can be glued onto a surface of the object, in order to protect the object against falsifications and/or in order to authenticate it, and/or in order to guarantee its intactness, and a security imprint produced by means of a solid imprint composition, containing at least one pigment in a bonding agent, characterized in that it comprises at least one security imprint produced with a solid imprint composition comprising at least one pigment and a hardened bonding agent incorporating at least one agent, known as a soluble agent, which is designed to be dissolved, at least in standard conditions of temperature and pressure, after the bonding agent has dried, in any polar and/or non-polar liquid solvent, which can permit ungluing of the adhesive when it is placed in contact with this adhesive after gluing, the quantity of soluble agent(s) in the bonding agent being designed such that the security imprint can form at least one stain which is visible, which reveals any attempt at ungluing by means of at least one such solvent.

The invention also extends to the object protected by a method for protection according to the invention. It thus also relates to an object comprising a thin protective film of synthetic material glued onto one of its surfaces, by means of a layer of adhesive interposed between the said surface and the object, in order to protect the object against falsifications and/or in order to authenticate it, and/or in order to guarantee its intactness, characterized in that it comprises, interposed between the film and the said surface of the object, at least one imprint, known as a security imprint, produced by means of a solid imprint composition, comprising at least one pigment and a hardened bonding agent, incorporating at least one agent, known as a soluble agent, which is designed to be dissolved, at least in standard conditions of temperature and pressure, after the bonding agent has dried,din any polar and/or non-polar liquid solvent which can permit ungluing of the adhesive when it is placed in contact with this adhesive after gluing, the quantity of soluble agent(s) in the bonding agent being designed such that the security imprint can form at least one stain which is visible, which reveals any attempt at ungluing by means of at least one such solvent.

In addition, advantageously and according to the invention, a method for protection, a method for production, a product, and an object according to the invention are characterized by all or part of the following characteristics:

- at least one soluble agent is selected from amongst the acrylates of alkyls, the methacrylates of alkyls, their polymers and their copolymers;
- the bonding agent incorporates a polymethacrylate of isobutyl as a soluble agent;
- an ink composition is used in which at least one soluble agent is formed from a chemical compound which has a low molecular weight, in particular lower than 5000, such as to be able to be soluble in polar and/or non-polar solvents;
- in order to produce a security imprint, a bonding agent is used which comprises a liquid solution, comprising a volatile solvent which dries in air, and at least one soluble agent;
- in order to produce a security imprint, a silk-screen ink base is used, comprising at least one agent which is soluble in solution, in a solvent containing at least 10% by volume, and in particularly mostly, propylene carbonate;
- in order to produce a security imprint, use is made of a bonding agent comprising a diluting wash which is fugitive in water;
- a security imprint is produced on one surface of the film, which is then glued onto the object;
- the film is glued by means of a layer of adhesive which is previously imprinted onto the film;
- a security imprint and an imprint of a layer of adhesive are produced on a single surface of the film;
- a layer of adhesive and a security imprint are imprinted such that they do not overlap one another;
- a layer of adhesive is imprinted on the film by silk-screen printing, covering a security imprint previously produced on the film;
- a security imprint is imprinted on a layer of adhesive without initial instantaneous adhesion, previously produced on the film;
- a security imprint is discontinuous, and is in the form of a raster or patterns;
- a security imprint is continuous, and extends opposite the entire surface of the film;
- the film is selected from amongst a single-layer film, a multi-layer film comprising superimposition of layers imprinted by silk-screen printing, varnish and/or inks, and a multi-layer assembly of superimposed synthetic materials;
- the film is formed from at least one synthetic material selected from amongst a polyurethane, a polyester, a polystyrene, a polypropylene and a polyethylene;
- the film has an overall thickness of between 5 and 500 microns;
- a security imprint is produced by silk-screen printing;
- at least one pigment is used, selected from amongst the pigments which are visible in visible light, and pigments which are invisible under lighting in visible light, and photoluminescent under lighting by at least one non-visible source of light; the pigment can be or can not be soluble, like the soluble agent(s) of the bonding agent, in the said solvents which can unglue the adhesive;

a security imprint is interposed between the film and a layer of adhesive which is associated with the said surface of the object;

a security imprint is interposed between a layer of adhesive which is associated with the film and the said surface of the object; and a security imprint is incorporated in a layer of adhesive, without mutual overlapping of the security imprint and the layer of adhesive.

The invention also relates to a method for protection, a method for production, a product and an object, characterized in combination by all or some of the characteristics described previously or hereinafter.

BRIEF DESCRIPTION OF THE DRAWINGS

Other objects, characteristics and advantages of the invention are apparent from the following description, provided with reference to the attached figures, in which.

In the figures, the thicknesses are enlarged in an exaggerated manner, for the purposes of illustration.

DESCRIPTION OF THE EMBODIMENTS

Figure 1:
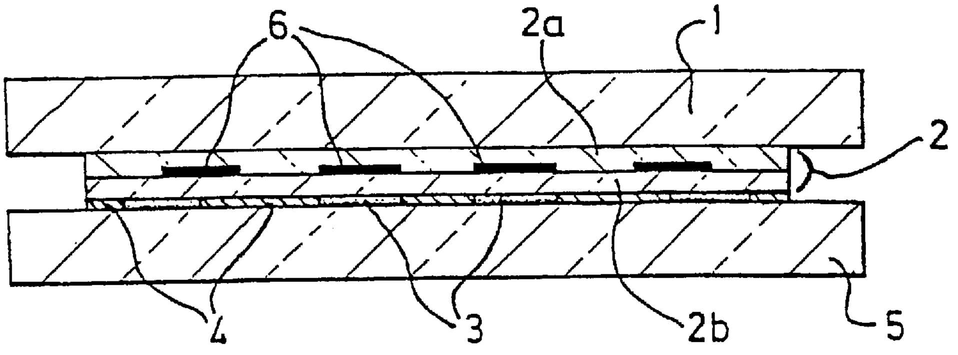
FIG. 1 is a schematic transverse cross-section of a product for protection according to a first embodiment of the invention.

The product for protection represented in FIG. 1 comprises a support 1 made of synthetic material, for example of polystyrene, which supports a thin protective film 2 of synthetic material, which is preferably transparent, a layer of adhesive 3, a security imprint 4 which is incorporated in spaces reserved in the thickness of the layer of adhesive 3, and a protective anti-adhesive paper 5 which covers the layer of adhesive 3.

In the example represented, the film 2 is a multi-layer film comprising two layers of polyurethane 2*a*, 2*b*, with an interposed imprint 6 of security patterns between them, which can be patterns of authentication and/or anti-photocopying and/or anti-forgery and/or anti-falsification or the like. This film 2 can be produced by successive silk-screen imprints, as described for example in EP-0,271,941 or U.S. Pat. No. 5,232,527, directly onto the polystyrene support 1. The support 1 is a support of the type known as non-adhesive, i.e. which can develop only low forces of bonding with most polymers. For example, it can be a sheet of polystyrene with a gram weight of approximately 120 g/m$^2$. This support 1 is selected with a format which exceeds in size that of the surface 8 of the object 9 to be protected. The film 2 can be produced by successive silk-screen printing operations on this support 1, by means of conventional silk-screen printing machines of the clapper type (articulated screen), or of the integral-raising screen type (screen mobile in translation). The support 1 is placed on the plate of the silk-screen machine, and the screen of the latter is provided with a liquid mixture previously prepared from a hydroxylated polyol and an isocyanate (for example polyacrylic resin "reference U 8560" and trimerised di-isocyanate hexamethylene "reference U 8580" sold by Laboratoires CHIMITEC (FRANCE)).

The quantity of mixture which is spread on the silk-screen screen is adjusted according to the thickness to be obtained for each layer. The first layer 2*a* of continuous polyurethane varnish is therefore imprinted according to a format which corresponds to that of the surface 8 of the object 9 to be protected, for example it is rectangular if the object is an official document such as a passport or an identity card which has a rectangular surface 8 to be protected.

The support 1 and the first layer 2*a* are then left in air in order to permit the polymerization. Before this polymerization is completed, a discontinuous interposed imprint 6 is produced, which forms patterns or rasters on the first imprint. This interposed imprint 6 can be produced either from a conventional ink composition, or even from an ink composition according to the invention, which incorporates a bonding agent comprising at least one agent which is soluble in the polar liquid solvents and/or non-polar solvents, as described hereinafter.

Before polymerization of this interposed imprint 6 and of the first layer 2*a* of polyurethane varnish 2*a* is completed, a subsequent imprint is produced, which is identical to the imprint of the first layer 2*a*, in order to obtain a second transparent layer of polyurethane 2*b*.

A discontinuous security imprint 4 is then produced on the second layer of polyurethane varnish 2*b*, after a time of polymerization which is between 12 h and 24 h in standard conditions of temperature and hygrometry. This time is determined such that the layer of polyurethane varnish 2*b* is both sufficiently partially polymerized to prevent any chemical interaction between this varnish 2*b* and the bonding agent of the security imprint 4, and, nevertheless to permit satisfactory application of the security imprint 4 onto the layer of varnish 2*b* (in particular avoiding phenomena of blotting of the screen). It should also be noted that the security imprint 4 is produced before the layer of varnish 2*b* is fully polymerized.

An imprint of transparent adhesive material is then produced, in order to obtain the layer of adhesive 3, by providing reserved spaces in the thickness of this layer of adhesive 3, around the patterns of the security imprint 4. Preferably, this imprint of adhesive material 3 is also produced before the final layer 2*b* of the film 2 is fully polymerized.

In order to produce the security imprint 4, an ink composition is used which is suitable for producing a silk-screen imprint, i.e. which is formed from a liquid solution with viscosity of between 0.1 Pa. s and 100 Pa. s, and in particular between 0.5 and 2.5 Pa. s. This ink composition comprises at least one pigment, and a bonding agent which is designed to carry the pigment(s) and to form a layer of imprint which is solid and hard after it has dried.

Throughout the text, "bonding agent" designates any liquid composition which is designed to be able to carry at least one pigment during an imprinting step, and to harden in conditions of hardening. According to the invention, the bonding agent is of the type which can be hardened by being dried in air.

This bonding agent incorporates at least one agent, known as a soluble agent, which is distinct from a pigment, and is designed to dissolve at least in standard conditions of temperature and pressure, i.e. at a pressure of approximately one atmosphere ($10^5$ Pa) and at a temperature of approximately 23° C., in any polar and/or non-polar liquid solvent which can permit ungluing of the adhesive, when it is placed in contact with the adhesive after gluing has taken place. The quantity of soluble agent(s) in the bonding agent is designed such that the security imprint, which is solid and hard after it has dried, can form at least one visible stain, which reveals any attempt to unglue by means of at least one such solvent, when this solvent comes into contact with this solid security imprint. Preferably, the soluble agent is also soluble in the said solvents in a sufficiently extensive temperature and pressure range around the standard conditions, in particular between 0.9 and 1.1 atmospheres (0.9 . 105 Pa, to 1.1 . $10^5$ Pa), and between 10° C. and 30° C.

The soluble agent(s) is/are selected in particular according to the nature of the adhesive used to glue the film 2 onto the surface 8 of the object 9, which itself determines the families of liquid solvents which can be used by defrauders in order to carry out ungluing after the film 2 has been glued onto the object 9.

In this respect it should be noted that in general, after having hardened, the compositions of inks, which can be assimilated to varnishes, are far less soluble in polar and/or non-polar liquid solvents than adhesives. Consequently, there is a very large number of solvents which can dissolve adhesives after they have dried, without being able to dissolve conventional ink compositions after they have dried. The incorporation of at least one soluble agent in the bonding agent of an ink composition according to the invention therefore makes it possible to render the security imprint 4 at least as soluble after it has dried, as the adhesive used to glue the film 2 onto the surface 8 of the object 9. It is therefore sufficient in general to incorporate a soluble agent which (i) is greatly soluble in most polar and/or non-polar solvents, (ii) is compatible with the ink composition and with the application of the latter in order to produce the security imprint 4, and (iii) does not dissolve in the adjacent layers (film 2 and/or adhesive 3 and/or surface 8 of the object 9), during production of the product for protection, or during application of the latter onto an object 9 to be protected.

In general, the adhesives which are used in the products for protection are acrylic or vinyl polyacetate (EVA) resins, which have relatively great power of solubility. In this case in particular, advantageously, use is made of at least one soluble agent selected from amongst the group of alkyl acrylates, alkyl methacrylates, and their polymers and copolymers. This group thus corresponds to that of vinylic compounds, in particular vinylic thermoplastic resins, which incorporate functions of carboxylic esters, i.e. of alkyl carboxylates. Preferably, the alkyl group of the carboxylate functions is an aliphatic alkyl comprising at least two carbon atoms. In fact, the solubility of these vinylic compounds in many solvents, in particular solvents based on aliphatic hydrocarbons, increases with the length of the alkyl chain, with the number of carboxylate functions, and, in the case of a polymer or of a copolymer, with the degree of association with one another of the molecules of monomer(s).

Advantageously, an isobutyl polymethacrylate is used as a soluble agent. A compound of this type constitutes an advantageous compromise by resisting the solvents of adhesives with acrylic or EVA bases, but continuing to be soluble, with solubility similar to that of these adhesives in the solvents which can unglue these adhesives, and in particular solvents with an aliphatic hydrocarbon base.

More generally, it is advantageous to use as a soluble agent at least one chemical compound which has a low molecular weight, and in particular lower than 5000, which will be soluble in most polar and/or non-polar solvents.

In the liquid ink composition used in order to form a security imprint, this soluble agent can be solubilized in a solvent which is a volatile solvent (i.e. which dries in ambient air or in hot air), for example propylene carbonate. The said solvent is of the type which dries in air, since a multi-component or photopolymer solvent, or a solvent which dries by chemical reaction, would be likely to give rise to compounds with long carbon chains, which would no longer be soluble in polar and/or non-polar solvents.

The bonding agent of the liquid ink composition used in order to produce a security imprint can be formed from several different soluble agents which are in solution in the same solvent, or even from a mixture of several liquid compositions which each contain at least one soluble agent, which is in solution in a particular solvent (provided that the different solvents of the different liquid compositions are compatible in a mixture with one another). Thus, for example, use can be made of a bonding agent comprising an agent which is solvent in aqueous polar solvents (in particular in water), an agent which is soluble in non-aqueous polar solvents (in particular in alcohols), and an agent which is soluble in non-polar solvents (in particular in hydrocarbons).

Many bonding agent compositions which incorporate one or a plurality of soluble agents of this type can be used. For example, use can be made of a bonding agent formed from a mixture of a reference solution "Solubilis", sold by Laboratoires CHIMITEC (FRANCE), which incorporates an isobutyl polymethacrylate, and is soluble in non-polar solvents and in non-aqueous polar solvents, and a liquid solution which is known as a diluting wash which is fugitive in water, reference "889202", sold by the company SICPA (SWITZERLAND), which is soluble in water and in aqueous polar solvents. The bonding agent can also be formed from only one of these two solutions. Thus, it is possible to use each of these solutions in a proportion of 0% to 100% by volume.

The bonding agent comprises a volatile solvent which can be used as a volatile solvent for the ink composition which is used to produce the security imprint. The ink composition is then formed from the mixture of one or a plurality of bonding agents as previously described, and from one or a plurality of pigments.

An example of ink composition according to the invention is as follows (the proposals being given by volume):

60 to 65% volatile solvent containing at least 10%, and in particular mostly, propylene carbonate;

5 to 25% pigment(s) selected from amongst visible organic pigments, visible mineral pigments, invisible organic photoluminescent pigments, and invisible mineral photoluminescent pigments; and 10 to 35% dry extract of bonding agent according to the invention.

The bonding agent can also comprise a non-zero proportion of agents other than the soluble agents and their solvents, for example retarding agents, wetting agents, anti-foaming agents etc.

The quantity of soluble agent(s) in the bonding agent must be sufficient for the security imprint 4 to dissolve and form a stain which is visible to the eye, when it is placed in contact with a solvent which can dissolve the adhesive. It must also be small enough to permit application of the ink composition, in order to produce the security imprint 4.

Preferably, the dry extract of the bonding agent comprises a proportion of soluble agent(s), in general of between 90% and 95% by volume, such that, after it has dried, the layer of imprint formed by the security imprint 4 comprises at least 25%, and in particular between 25% and 90%, of soluble agent(s).

The bonding agent must also be designed such that it is compatible with the pigment or the various pigments (distinct from the bonding agent and thus from the soluble agent(s)) incorporated in the ink composition. As the pigment, use can be made of one or a plurality of pigments visible in visible light, and/or one or a plurality of pigments invisible under lighting in visible light and photoluminescent under lighting by at least one source of non-visible light, for example a source of ultraviolet rays.

The security imprint can be produced in one or several steps, in particular in order to obtain colored patterns. The security imprint can be of the discontinuous type, and can be in the form of a raster (formed from separate dots which are spaced to a greater or lesser extent, deposited with density which is or is not uniform), or patterns (images, symbols, letters etc). It can also be an imprint of a uniform continuous type, which extends opposite the entire surface of the film 2.

On completion of the polymerization and drying of the various layers 2$a$, 6, 2$b$, 3, 4 of the film 2, a complex multi-layer product is obtained, which can be applied to an object 9 to be protected. The layer of adhesive 3 and the security imprint 4 are covered with an anti-adhesive protective sheet, which for example is made of detachable silicon-coated paper 5. The assembled product thus obtained can be stored and distributed without particular precautions.

It should be noted that according to this embodiment, the layer of adhesive 3 can be formed from any adhesive composition. In particular, it can be a pressure-sensitive adhesive (self-adhesive) such as an acrylic adhesive composition, in particular of the type sold by Laboratoires CHIMITEC (FRANCE) under the reference "AD73EPSR", or an adhesive which can be re-activated by heat, and is imprinted at ambient temperature, which is compatible with the layer of polyurethane varnish 2$b$, and in particular a thermally activated glue formed from a copolymer in aqueous dispersion, such as an adhesive reference "ADTH50" or "ADTH21" sold by Laboratoires CHIMITEC (FRANCE).

Figure 2:
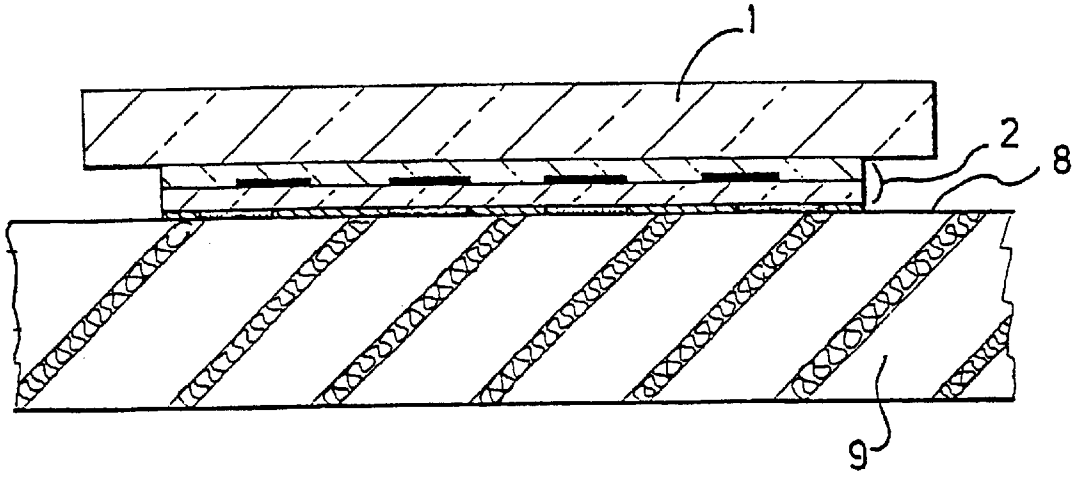
FIG. 2 is a schematic transverse cross-section of a first step of a method for protection of an object, with the product for protection in FIG. 1.
Figure 3:
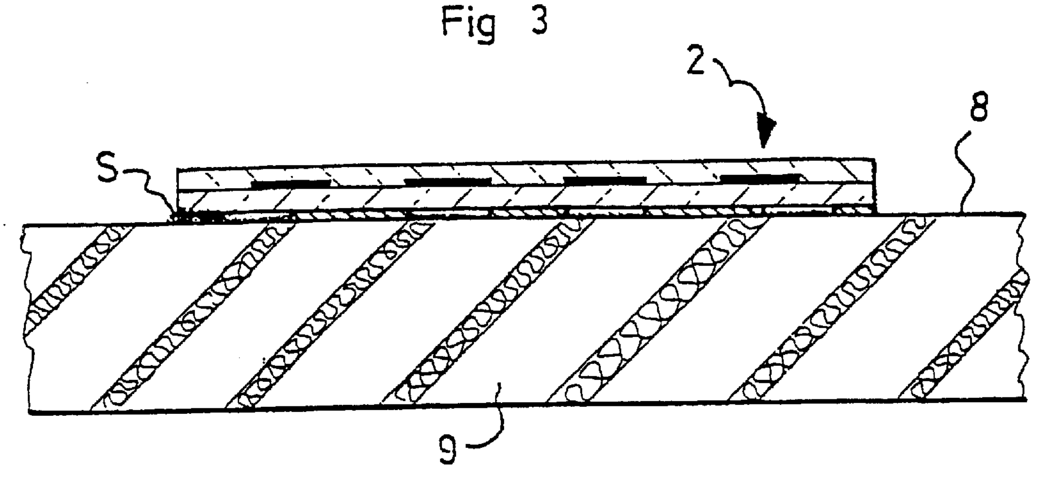
FIG. 3 is a schematic transverse cross-section of the object protected by the product for protection according to the invention, in FIG. 1.

In the case of a self-adhesive, it is sufficient to unglue the silicon-coated paper 5, to apply the film 2 in contact with the surface 8 of the object 9 to be protected (FIG. 2), whilst exerting pressure such as to glue the layer of adhesive 3 to the surface 8, then to unglue the support 1, in order to obtain the protected object, as shown in FIG. 3. In the case of a thermally activated adhesive 3, the support 1 with the film 2 is hot-rolled onto the surface 8 of the object 9.

As can be seen in FIG. 3, during an attempted fraud which is aimed at ungluing the film 2 from the object 9, if a solvent S is injected at the periphery of the film 2, between this film 2 and the surface 8 of the object 9, in order to weaken the adhesive power of the adhesive 3 so as to unglue the film 2 from the object 9, the soluble agents of the bonding agent of the security imprint 4 dissolve, and this security imprint spreads and forms visible stains which make it possible to reveal the attempted fraud immediately. In addition, the security imprint 4 is transferred onto the object 9, which remains definitively marked, thus revealing the attempted fraud and making it in vain, since the object 9 itself is damaged. Nevertheless, the presence of the security imprint 4 cannot be detected in advance by observation of the object 9. In fact, a priori, there is nothing to distinguish this security imprint from the other imprints conventionally used.

Preferably, a security imprint 4 is produced at the periphery of the film 2, and in particular at its corners, in the case of a rectangular film. In fact, it is from the corners that attempted fraud is initiated in general.

Figure 4:
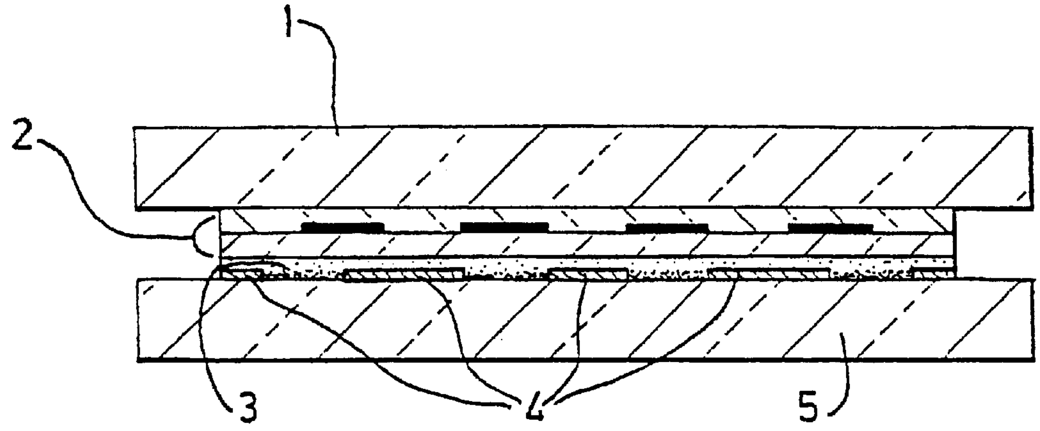
FIGS. 4 and 5 are schematic transverse cross-sections, representing respectively a second embodiment and a third embodiment of a product for protection according to the invention.

FIG. 4 represents a second embodiment of the product, according to the invention, which is similar to that in FIG. 1, except for the fact that the layer of adhesive 3 is a continuous layer which extends over the entire surface of the film 2, and a security imprint 4 is subsequently produced directly on this layer of adhesive 3. For this purpose, it is necessary for this layer of adhesive 3 to be a layer of adhesive which can be sealed by heat, without tack, i.e. without instantaneous initial adhesion.

Figure 5:
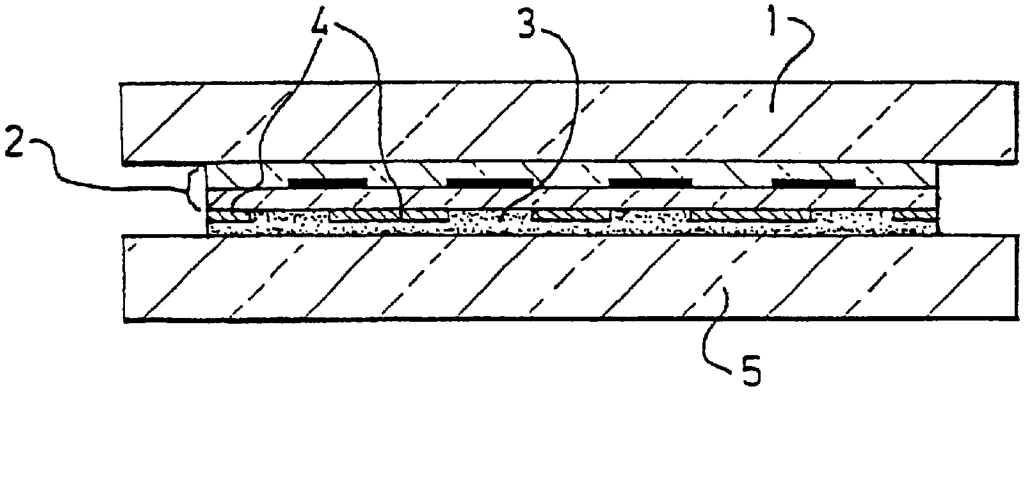

The third embodiment represented in FIG. 5 differs from the previous one in that the security imprint 4 is produced firstly on the second layer 2$b$ of polyurethane varnish, then the layer of adhesive 3 is imprinted on top of the security imprint 4. In this embodiment, any layer of adhesive 3 can be used, as in the case of the first embodiment.

It should be noted that although the adhesive compositions which can be imprinted by silk-screen printing incorporate solvents, it is found in practice that it is possible to imprint a layer of adhesive 3 by silk-screen printing on a security imprint 4 which incorporates a soluble agent, in particular an isobutyl polymethacrylate, or, on the other hand, to provide a security imprint 4 on a layer of adhesive 3 of this type, without the bonding agent of the ink composition according to the invention (incorporating at least one soluble agent), used for the security imprint 4, dissolving in contact with the solvent of the layer of adhesive, whereas the bonding agent of the security imprint dissolves when it is subsequently put into contact with a solvent as represented in FIG. 3.

No clear explanation can be provided for this unexpected result. It is however considered that this imprint possibility is derived from the method for imprinting by silk-screen printing, which does not give rise to any shearing forces between the layer which is being imprinted, and that on which this imprint is produced. Consequently, even if partial solubilization takes place between the two layers, its thickness is limited, and in particular it does not give rise to any smudging or visible stains.

Figure 6:
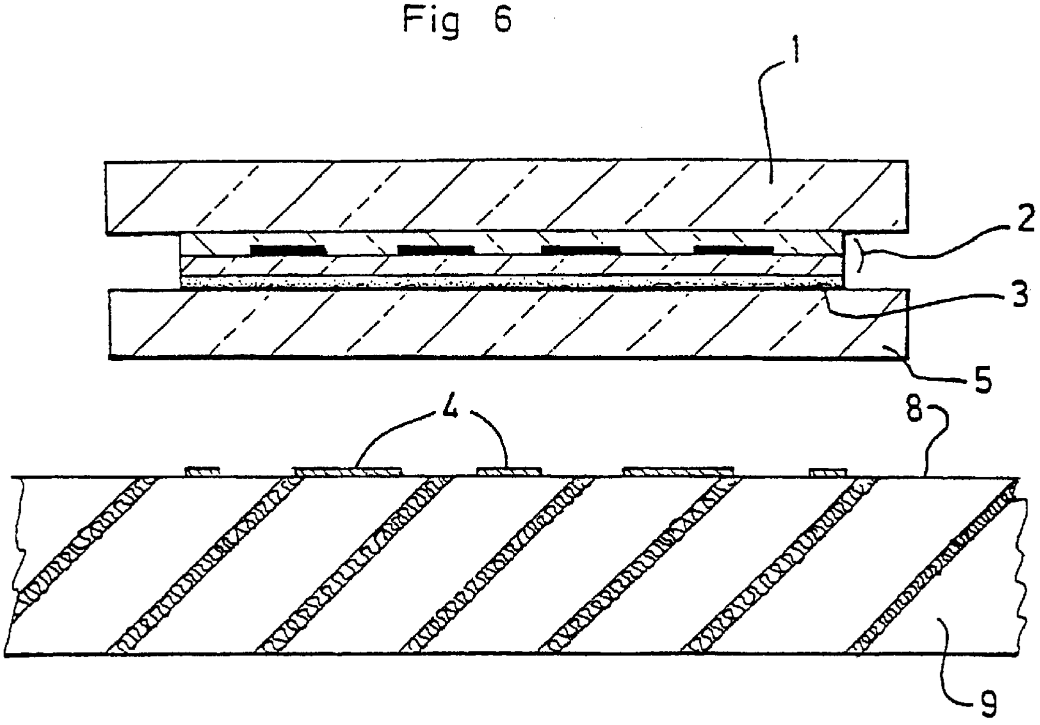
FIG. 6 is a schematic transverse cross-section representing a variant embodiment of a method for protection according to the invention.

The embodiment in FIG. 6 makes it possible, if considered necessary, to prevent any contact of the security imprint

4 with an adhesive, before the film 2 is placed on the object 9. In this variant embodiment, a protective film 2 is used which is similar to that represented in FIG. 1, and comprises a continuous layer of adhesive 3, this film 2 being supported by a polystyrene support 1, and the layer of adhesive 3 being covered by a protective silicon-coated paper 5. This product thus constitutes a conventional product, as described in EP-0,271,941 or U.S. Pat. No. 5,232,527.

Figure 7:
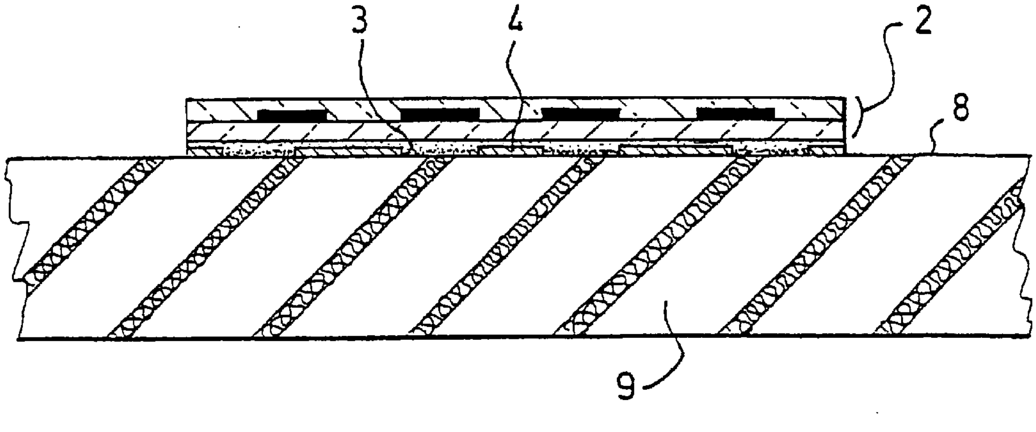
FIG. 7 is a schematic transverse cross-section representing the protected object obtained according to the variant in FIG. 6.

A security imprint 4 is produced with an ink composition as previously described (incorporating at least one pigment and a bonding agent comprising at least one agent which is soluble in polar solvents and/or in non-polar solvents), not on the film itself, but on the object 9, i.e. on the surface 8 of the object 9 to be protected. The film 2 is then applied to the surface 8, covering the security imprint 4 in order to obtain the protected object 9 as represented in FIG. 7.

Figure 8:
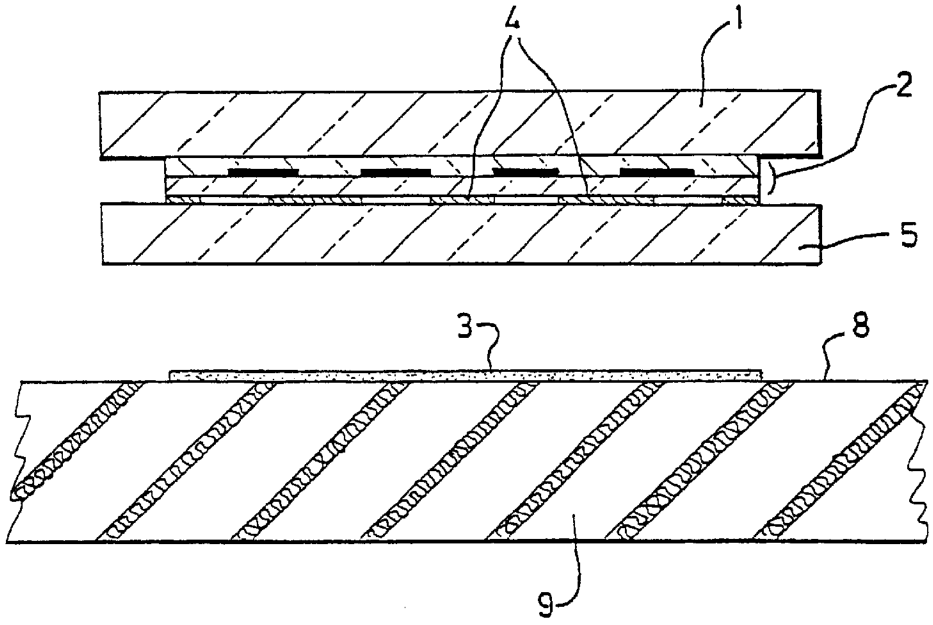
FIGS. 8 and 9 are figures similar to FIGS. 6 and 7, representing another variant embodiment of a method for protection according to the invention.
Figure 9:
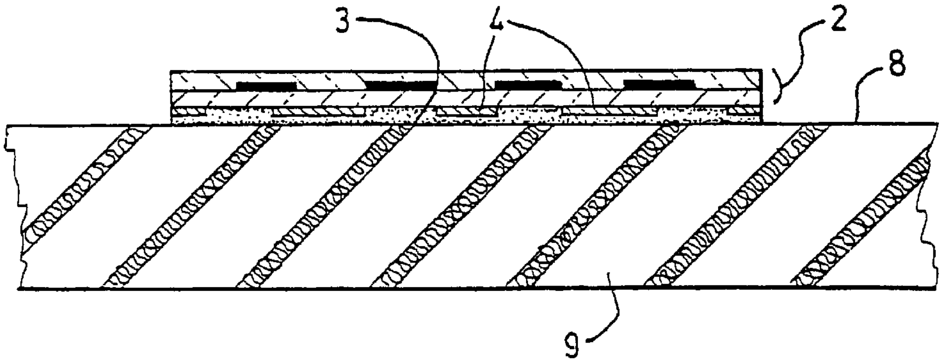

FIG. 8 represents another variant embodiment, in which the security imprint 4 is supported by the film 2, whereas the layer of adhesive 3 is produced on the surface 8 of the object 9. In this case also, the protected object 9 as represented in FIG. 9 is obtained, incorporating the security imprint 4.

In these last two variants, it is found, again unexpectedly, that the bonding agent of the security imprint is not dissolved when the adhesive 3 is applied to the security imprint 4, when the imprints are produced by silk-screen printing.

Figure 10:
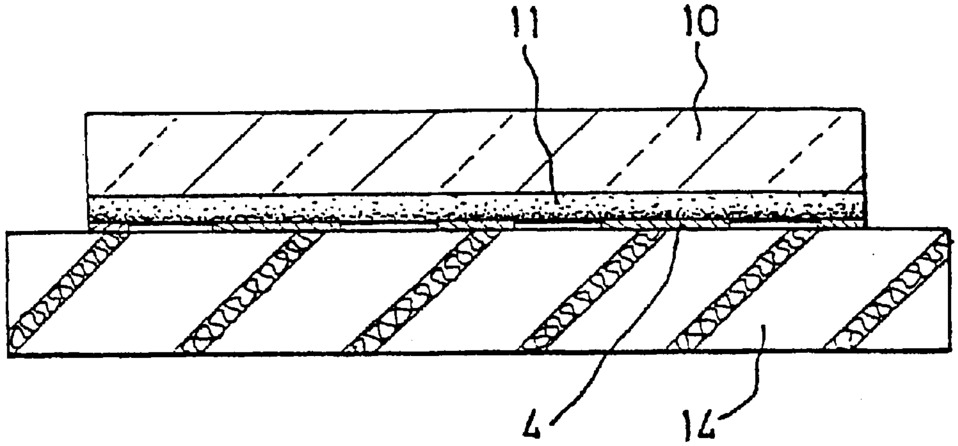
FIGS. 10 and 11 are schematic transverse cross-sections, representing respectively a fourth embodiment and a fifth embodiment of a product for protection according to the invention.

FIG. 10 represents a fourth embodiment of the invention, in which the protective film consists of a single-layer film 10, which for example is made of transparent polyester, which supports a layer of polyethylene 11, which forms an adhesive which can be sealed by heat. On this layer 11 of adhesive which can be sealed by heat, a discontinuous security imprint 4 is produced by silk-screen printing, as previously described.

Figure 11:
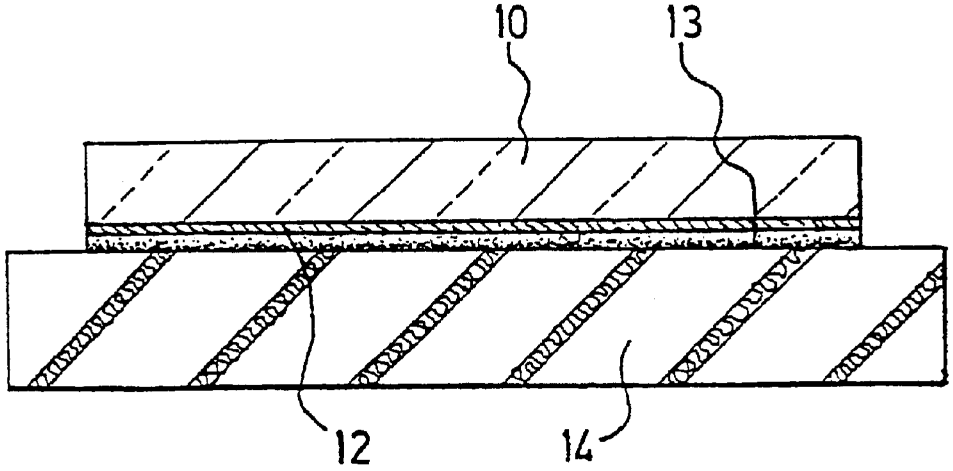

FIG. 11 represents a fifth embodiment, in which a continuous security imprint 12 is produced directly on a single-layer film 10 of synthetic material such as a polyester or a polypropylene, then this security imprint 12 is covered with a layer of adhesive 13, which can be a self-adhesive or an adhesive which can be sealed by heat. This layer of adhesive 13 is applied by means of silk-screen printing, like the security imprint 12. The security imprint 12 extends over the entire surface of the layer of adhesive 13, at least substantially in the same format as the film 10. This security imprint 12 is produced with an ink composition comprising at least one pigment and a bonding agent, comprising at least one agent which is soluble in polar solvents and/or in non-polar solvents, as previously described.

In this fifth embodiment, use can advantageously be made of a pigment which is visible in visible light, but photoluminescent in invisible light, for example a pigment which is photoluminescent under ultraviolet light. One or a plurality of visible pigments can also be used.

The multi-layer assembly formed by the film 10, the layer of adhesive 13 and the security imprint 12 can be completely transparent (case of a pigment which is photoluminescent under ultraviolet light for example), or translucent (case of a visible pigment which is slightly dosed) or opaque (case of a visible pigment which is highly dosed), depending on the applications envisaged. In the case of application for the purpose of protection against falsifications of variable inscriptions on official documents, the assembly must be transparent, in order to allow these variable inscriptions to be seen normally. In the case of application for the purpose of authentication or guarantee of intactness of a document or packaging, the assembly can be translucent or opaque.

However, it will be appreciated that it is preferable for the film 2, 10 itself to be transparent, so as to allow stains to be seen, which are derived from the solubilization of the security imprint 4, 12, in the event of an attempted fraud. However, this is not strictly necessary in certain applications in which it is sufficient to detect attempted fraud only after the film has been unglued.

It should be noted that in the fifth embodiment, the layer of adhesive 13 and the continuous security imprint can be associated by other means of imprinting, for example by continuous rolling, rather than by silk-screen printing.

In the two embodiments in FIGS. 10 and 11, an anti-adhesive protective paper 14 is also provided on the final layer of the protective product.

Figure 12:
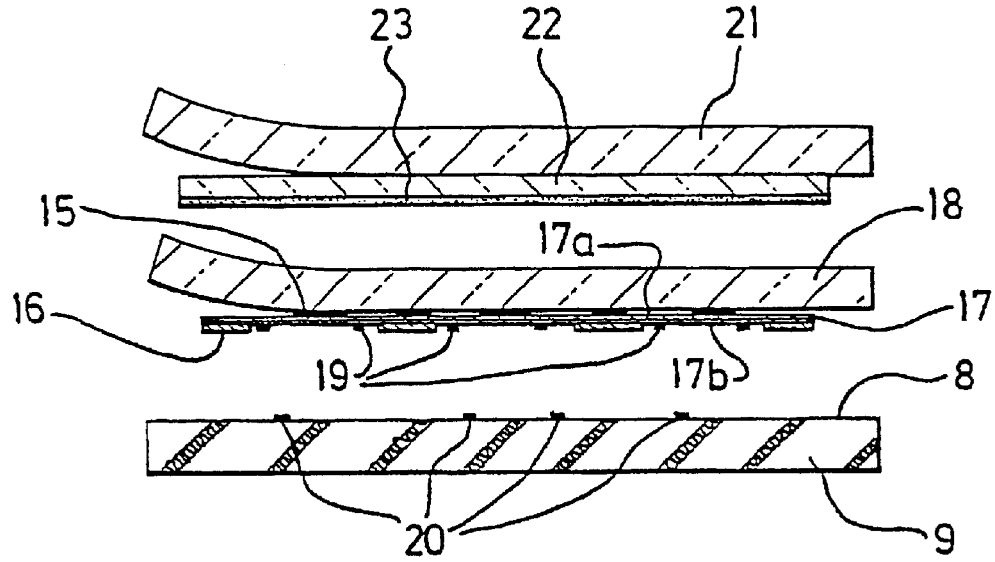
FIG. 12 is a schematic transverse cross-section of another variant embodiment of a method for protection according to the invention, in which an interposed imprint support is used.

FIG. 12 represents another variant embodiment, in which security imprints 15, 16 are produced, not on a protective film or on the object 9 to be protected, but on an intermediate film 17 formed by one or a plurality of layers of adhesive or varnish supported by a support 18. An intermediate film 17 which is supported by its support 18 forms an intermediate sheet, which in particular can be used for production of variable inscriptions, such as described for example in FR-2,763,889. In order to produce this intermediate sheet, firstly a security imprint 15 is produced, which is similar to that previously described (incorporating at least one agent which is soluble in polar solvents and/or non-polar solvents) on the support 18, then a first layer of varnish 17*a* is imprinted, which covers the first security imprint 15, then a continuous layer of adhesive 17*b* which can be re-activated by heat is imprinted, then a second security imprint 16 is imprinted on the said layer of adhesive 17*b* which can be re-activated by heat. In the example represented, variable inscriptions 19 are also imprinted by any means of imprinting required (manually, laser printing, ink-jet printing etc).

The support 18 itself can be a paper and/or a single-layer or multi-layer synthetic film which does not adhere to most polymers, and in particular a polystyrene support.

On its surface 8 to be protected, the object 9 to be protected initially supports inscriptions 20. The protective film used in this variant can be a single-layer polyurethane film 22 produced by silk-screen printing on a polystyrene support 21 with a continuous layer of adhesive 23 such as described in EP-0,271,941 or U.S. Pat. No. 5,232,527. The layer of adhesive 23 is however preferably formed from an adhesive which can be re-activated by heat.

Figure 13:
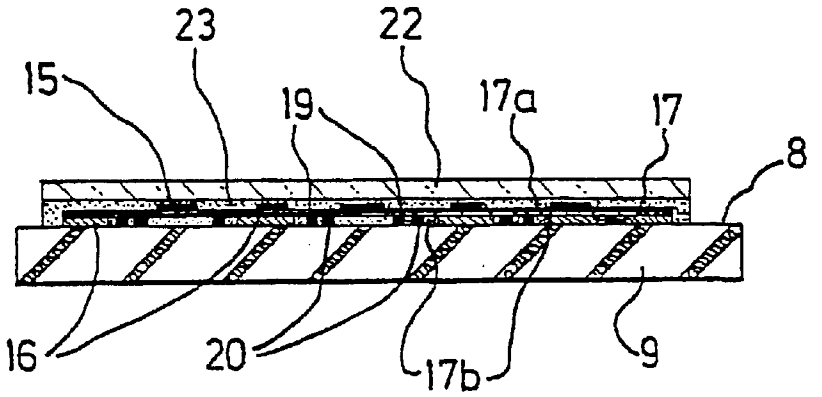
FIG. 13 is a schematic transverse cross-section representing an object protected by the method in FIG. 12.

In order to obtain the protected object 9 represented in FIG. 13, the intermediate film 17 is hot-rolled onto the surface 8 of the support 9 to be protected, then the support 18 is removed, then the film 22 is hot-rolled onto this intermediate film 17, then the support 21 is removed. As can be seen, the security imprints 15, 16 are interposed between the film 22 and the object 9.

Figure 14:
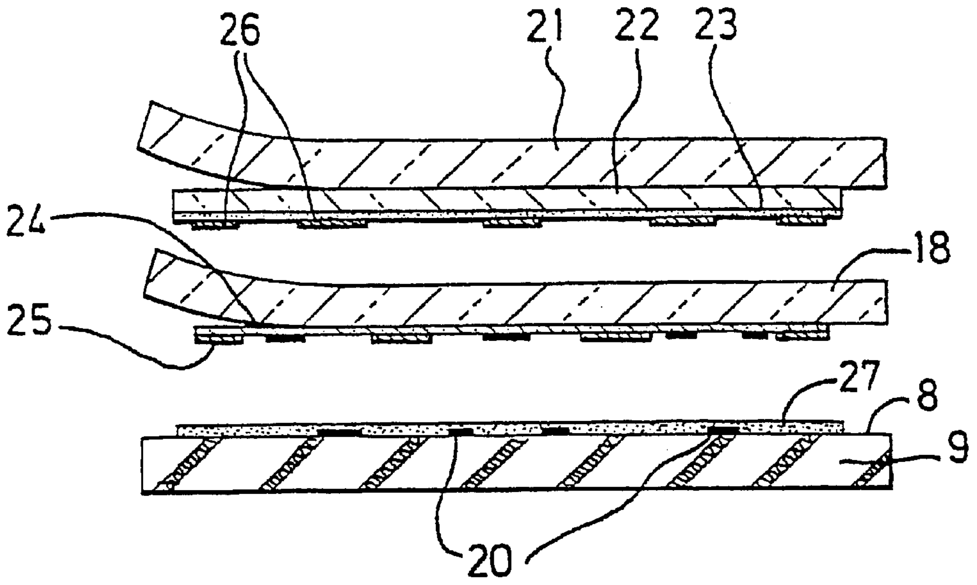
FIGS. 14 and 15 are views similar to FIGS. 12 and 13, representing another variant embodiment of the invention.
Figure 15:
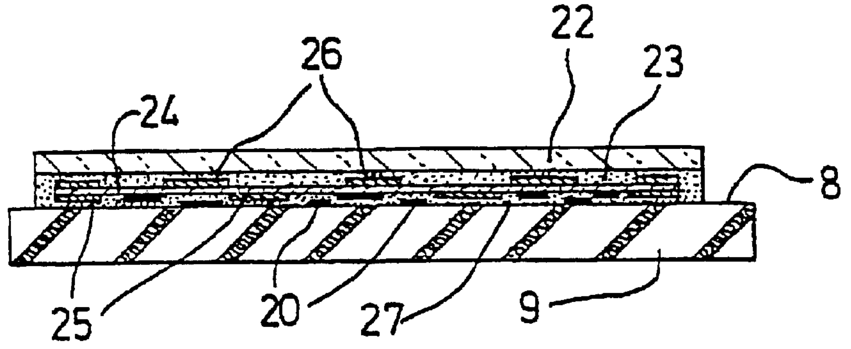

FIG. 14 represents a variant embodiment similar to that in FIG. 12, but in which the intermediate film 24 is formed from a single layer 24 of polyurethane varnish produced by silk-screen printing on the support 18. A security imprint 25 is then produced on this intermediate film 24. A second security imprint 26 is also produced on the layer of adhesive 23 of the film 22. In addition, the object 9 to be protected supports a layer of adhesive 27, which is previously produced on its surface 8, and covers the inscriptions 20. In this variant embodiment, the layers of adhesive 23, 27 can be pressure-sensitive self-adhesives or adhesives which can be reactivated by heat. In order to obtain the protected object 9 in FIG. 15, the intermediate film 24 is applied to the layer of adhesive 27 of the object 9, the support 18 is removed, then the film 22 is applied to the intermediate film 24, then the support 21 is removed. In this case also, security imprints 25, 26 are interposed between the film 22 and the object 9.

In the embodiments in FIGS. 12 to 15, the protective product according to the invention is formed in two parts, i.e. the film 22 on its support 21, and the intermediate film 17, 24 on its support 18. The security imprints 15, 16, 25, 26 are not all produced on the film itself, but also on the support 18 of the intermediate film and/or on this intermediate film itself, which thus act as imprint supports for these security imprints. However, in all cases, the security imprints are imprinted on imprint supports (film and/or intermediate film. and/or support for the film or for an intermediate film), which are designed to permit interposition of each security imprint 15, 16, 25, 26 between the film 22 and the object 9.

EXAMPLES

Four protective products according to the invention were produced, with the following characteristics:

product 1: in accordance with FIG. 1, with a rectangular format of 80 mm×120 mm, with a film 2 approximately 45 μm thick;

product 2: in accordance with FIG. 10, with a support 10 made of polyester 50 μm thick, and a layer of adhesive which can be heat sealed, made of polyethylene 76 μm thick, with the same rectangular format as the product 1;

product 3: in accordance with FIG. 11, the support 10 being a polypropylene 35 μm thick, and the adhesive 13 being an adhesive with a non-aqueous base ref. L4002 made by the company KISSEL & WOLF (GERMANY), with the same rectangular format as product 1; and product 4: similar to product 3, but with an adhesive with an aqueous base, ref. AD73EPSR, made by Laboratoires CHIMITEC.

Security imprints were produced by silk-screen printing in the form of chequered patterns and letters on these products, by means of an ink composition with the following formula:

"Solubilis" solution sold by Laboratoires CHIMITEC (FRANCE): 85%;

yellow fluorescent invisible pigment ref. CD704 sold by the company RIEDEL DE HAN (GERMANY): 10%; and concentrated retardant sold by Laboratoires CHIMITEC: 5%.

Each protective product was glued onto an 80 g/$m^2$ security paper comprising 50 % cotton and 50 % wood, ref. PIC-TEST, supplied by the company ARJOWIGGINS APPLETOWN (FRANCE).

It was then attempted to unglue the film in dry conditions, in hot conditions, or by means of various solvents. The following table gives the results obtained.

| Protective product/ Solvent | 1 | 2 | 3 | 4 |
|---|---|---|---|---|
| Dry ungluing | The paper was defibrated, and the ink was transferred slightly | The paper was defibrated, and most of the ink was transferred | The paper was slightly defibrated, and the ink was transferred | The paper was slightly defibrated, and the ink was transferred |
| Hot ungluing | The ink was transferred completely | The ink was transferred | The ink was not transferred | The ink was not transferred |

-continued

| Protective product/ Solvent | 1 | 2 | 3 | 4 |
|---|---|---|---|---|
| Acetone | The ink was partially transferred, and spread on the paper | The ink was partially transferred and spread on the film and the paper. The film was crumpled. | The ink became pale and dirtied the paper | The ink became pale and dirtied the paper |
| Ether | The ink was partially transferred, and spread on the paper | The ink was partially transferred, and spread on the film and the paper | The ink became pale and dirtied the paper | The ink became pale and dirtied the paper |
| Methylated spirit | The ink was partially transferred | The ink was partially transferred, and spread slightly on the paper | The ink was not transferred | The ink was not transferred |
| Petrol C | The ink was partially transferred, and spread slightly on the paper | The ink was partially transferred | The ink was partially transferred | The ink was not transferred, but deteriorated slightly |
| Petrol F | The ink was partially transferred, and spread slightly on the paper | The ink was partially transferred and spread on the paper | The ink was almost totally transferred | The ink was partially transferred |
| White spirit | The ink was partially transferred | The ink was partially transferred and spread slightly on the paper | The ink was partially transferred | The ink was partially transferred |

The invention can form the basis of many variant embodiments in comparison with the embodiments and variants previously described, which can be combined with one another.

What is claimed is:

1. A product for protecting an object, the product comprising:

a synthetic protective film; an adhesive on said protective film, said adhesive for adhering said protective film to the object to be protected; and a solid security imprint between said protective film and the object to be protected when said protective film is adhered to the object, said solid security imprint comprising a pigment and a bonding agent having a soluble agent that, when dissolved in a solvent that releases the object from said adhesive, produces a visible stain.

wherein said soluble agent is selected from the group of soluble agents consisting of acrylates of alkyls and metharylates of alkyls and polymers and copolymers thereof.

2. The product of claim 1, wherein said soluble agent comprises polymethacrylate of isobutyl.

3. The product of claim 1, wherein said soluble agent has a molecular weight less than 5000.

4. The product of claim 1, wherein said security imprint comprises plural spaced apart sections.

5. The product of claim 4, wherein said security imprint and said adhesive are coplanar in a same layer and wherein said adhesive is between said plural spaced apart sections.

6. The product of claim 1, wherein said security imprint comprises a section having a lateral extent matching that of said protective film.

7. The product of claim 1, wherein said protective film is selected from the group of film consisting of polyurethane, polyester, polystyrene, polypropylene, and polyethylene.

8. The product of claim 1, wherein said protective film has a thickness of between 5 and 50 microns.

9. The product of claim 1, wherein said security imprint is embedded in a surface of said adhesive.

10. The product of claim 1, wherein said soluble agent is dissolvable at 10° to 30° C. and at 0.9 to 1.1 atmospheres pressure.

11. A product for protecting an object, the product comprising:

a synthetic protective film;

an adhesive on said protective film, said adhesive for adhering said protective film to the object to be protected; and a solid security imprint between said protective film and the object to be protected when said protective film is adhered to the object, said solid security imprint comprising a pigment and a bonding agent having a soluble agent that, when dissolved in a solvent that releases the object from said adhesive, produces a visible stain, wherein said soluble agent is selected from the group of soluble agents consisting of acrylates of alkyls and metharylates of alkyls and polymers and copolymers thereof, wherein said soluble agent comprises between 25% and 90% of said security imprint by volume.

* * * * *

UNITED STATES PATENT AND TRADEMARK OFFICE

CERTIFICATE OF CORRECTION

PATENT NO. : 6,592,972 B1
DATED : July 15, 2003
INVENTOR(S) : Francois Trantoul

It is certified that error appears in the above-identified patent and that said Letters Patent is hereby corrected as shown below:

Column 14,
Line 60, change "metharylates" to -- methacrylates --.

Column 16,
Line 14, change "metharylates" to -- methacrylates --.

Signed and Sealed this

Seventh Day of October, 2003

JAMES E. ROGAN
*Director of the United States Patent and Trademark Office*